(12) United States Patent
Oliveri

(10) Patent No.: US 7,058,786 B1
(45) Date of Patent: Jun. 6, 2006

(54) OPERATING SYSTEM DATA COMMUNICATION METHOD AND SYSTEM

(75) Inventor: Richard Oliveri, Warren, NJ (US)

(73) Assignee: Hewlett-Packard Development Company, Houston, TX (US)

(*) Notice: Subject to any disclaimer, the term of this patent is extended or adjusted under 35 U.S.C. 154(b) by 693 days.

(21) Appl. No.: 10/051,773

(22) Filed: Jan. 17, 2002

(51) Int. Cl.
*G06F 12/00* (2006.01)
*G06F 12/02* (2006.01)

(52) U.S. Cl. ............... 711/203; 711/6; 711/204; 717/127; 717/128; 717/129; 718/1; 718/100

(58) Field of Classification Search ........ 711/203–209, 711/6; 717/127–129; 718/1, 100, 102
See application file for complete search history.

(56) References Cited

U.S. PATENT DOCUMENTS

| 5,522,075 | A  | * | 5/1996  | Robinson et al. ......... 718/100 |
| 5,526,504 | A  | * | 6/1996  | Hsu et al. ............... 711/207 |
| 5,729,710 | A  | * | 3/1998  | Magee et al. ............ 711/203 |
| 5,771,383 | A  | * | 6/1998  | Magee et al. ............ 719/312 |
| 5,873,124 | A  | * | 2/1999  | Draves .................. 711/202 |
| 6,044,445 | A  | * | 3/2000  | Tsuda et al. ............ 711/163 |
| 6,341,324 | B1 | * | 1/2002  | Caulk et al. ............ 710/260 |
| 6,349,355 | B1 | * | 2/2002  | Draves et al. ............. 711/6 |
| 6,618,736 | B1 | * | 9/2003  | Menage .................. 707/204 |
| 6,728,949 | B1 | * | 4/2004  | Bryant et al. ........... 717/127 |
| 6,732,138 | B1 | * | 5/2004  | Browning et al. ........ 718/102 |
| 6,802,054 | B1 | * | 10/2004 | Faraj .................... 717/128 |
| 6,842,893 | B1 | * | 1/2005  | Sangavarapu et al. ..... 717/129 |
| 6,988,263 | B1 | * | 1/2006  | Hussain et al. ......... 717/128 |
| 2004/0064813 | A1 | * | 4/2004 | Neiger et al. ............. 718/1 |

OTHER PUBLICATIONS

Bugnion, et al., "Disco: Running Commodity Operating Systems on Scalable Multiprocessors," ACM Transactions on Computer Systems, vol. 15, No. 4, Nov. 1997, pp. 412-447.*

Bugnion, et al., "Disco: Running Commodity Operating Systems on Scalable Multiprocessors" Stanford University, Computer Systems Laboratory, 1997.*

* cited by examiner

*Primary Examiner*—Majid Banankhah

(57) ABSTRACT

In a computer system having different memory address spaces, for example, user space and kernel space, a method and system is provided for communicating data. A data structure is defined in the kernel space to store data. The data structure is virtually mapped to an application in user space such that the application can access the data structure through virtual memory addresses. By directly accessing the data structure, data transfers between the address spaces using system calls and/or interrupts can be reduced.

18 Claims, 4 Drawing Sheets

OPERATING SYSTEM DATA COMMUNICATION METHOD AND SYSTEM

FIELD OF THE INVENTION

The invention relates to the operating system arts. It finds particular application to a method and system of communicating data. It will be appreciated that the present invention will find application in any type of computer and/or operating system.

BACKGROUND OF THE INVENTION

An operating system (OS) is a set of programs which provide for the basic operation of a computer. The operating system is low-level software which, for example, schedules tasks, allocates storage, handles the interface to peripheral hardware, and presents a default interface to a user when no application program is running. The operating system also typically manages memory, controls hard and floppy disk drives, loads and executes programs, provides services to running programs, and provides the user with a means for inputting and outputting information.

The operating system may be split into a kernel and various system programs which use facilities provided by the kernel to perform higher-level house-keeping tasks, often acting as servers in a client-server relationship. The kernel is a program responsible for the machine level operation of the system and connections to hardware devices.

In certain operating systems, for example UNIX, the operating system and kernel have a designated memory address space for their use (e.g. kernel space) and user programs have a different designated memory address space for their use (e.g. user space). The two address spaces usually have different access privileges and protections associated with them. For example, the kernel space is restricted from access by user programs so that the user programs do not have an opportunity to intentionally or accidentally make changes to the kernel space memory that may cause system problems.

At certain times, information is needed to be passed between kernel space and user space. However, a simple memory copy from one location to another is not sufficient because you're dealing with two different address spaces. Rather, a system call is made that interrupts the system and changes system modes that allows data to be transferred from one address space to the other. There is a processing overhead involved with this data transfer operation which for certain executing applications may be detrimental to its performance.

An exemplary situation is when one application (e.g. a monitoring application) is monitoring and evaluating the performance of another application (e.g. a target application). Here, the operating system collects sample data for the monitoring application regarding the performance of the target application. Since the monitoring application executes in user space, system calls and/or interrupts are made in order to transfer data to or from the operating system.

Heavy-weight sampling is a term used to describe when the operating system transfers sample data to the monitoring application every time a sample is collected. Thus, a system call is made for every sample data. Light-weight sampling is a term used to describe when the operating system transfers sample data to the monitoring application after a pre-selected number of samples are collected. Thus, light-weight sampling reduces the number of system calls but when a data transfer is made, a larger amount of data is passed which may itself take additional system resources and time to perform.

The present invention provides a new and useful method and system of transferring data that addresses the above problems.

SUMMARY OF THE INVENTION

In one embodiment, a system of communicating between a kernel and an application in user space is provided. It includes a data structure that is maintained by the kernel for storing data and is virtually addressed to the application. One or more parameters are associated to the data structure that represent one or more pre-determined communications where the kernel and the application communicate by changing the one or more parameters to reduce communication by system calls.

In accordance with another embodiment, a data structure is maintained by an operating system for storing data. A virtual memory mapping maps the data structure to an application allowing it to read the data without transferring the data using a system interrupt.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example embodiments of the system and method.

DETAILED DESCRIPTION OF ILLUSTRATED EMBODIMENTS

The following includes definitions of exemplary terms used throughout the disclosure. Both singular and plural forms of all terms fall within each meaning:

"Signal", as used herein, includes but is not limited to one or more electrical signals, analog or digital signals, one or more computer instructions, a bit or bit stream, or the like.

"Software", as used herein, includes but is not limited to one or more computer readable and/or executable instructions, routines, algorithms, modules or programs including separate applications or code from dynamically linked libraries for performing functions and actions as described herein. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

"Logic", as used herein, includes but is not limited to hardware, firmware, software and/or combinations of each to perform a function(s) or an action(s), and/or to cause a function or action from another component. For example, based on a desired application or needs, logic may include a software controlled microprocessor, discrete logic such as an application specific integrated circuit (ASIC), or other programmed logic device. Logic may also be fully embodied as software.

Figure 1:
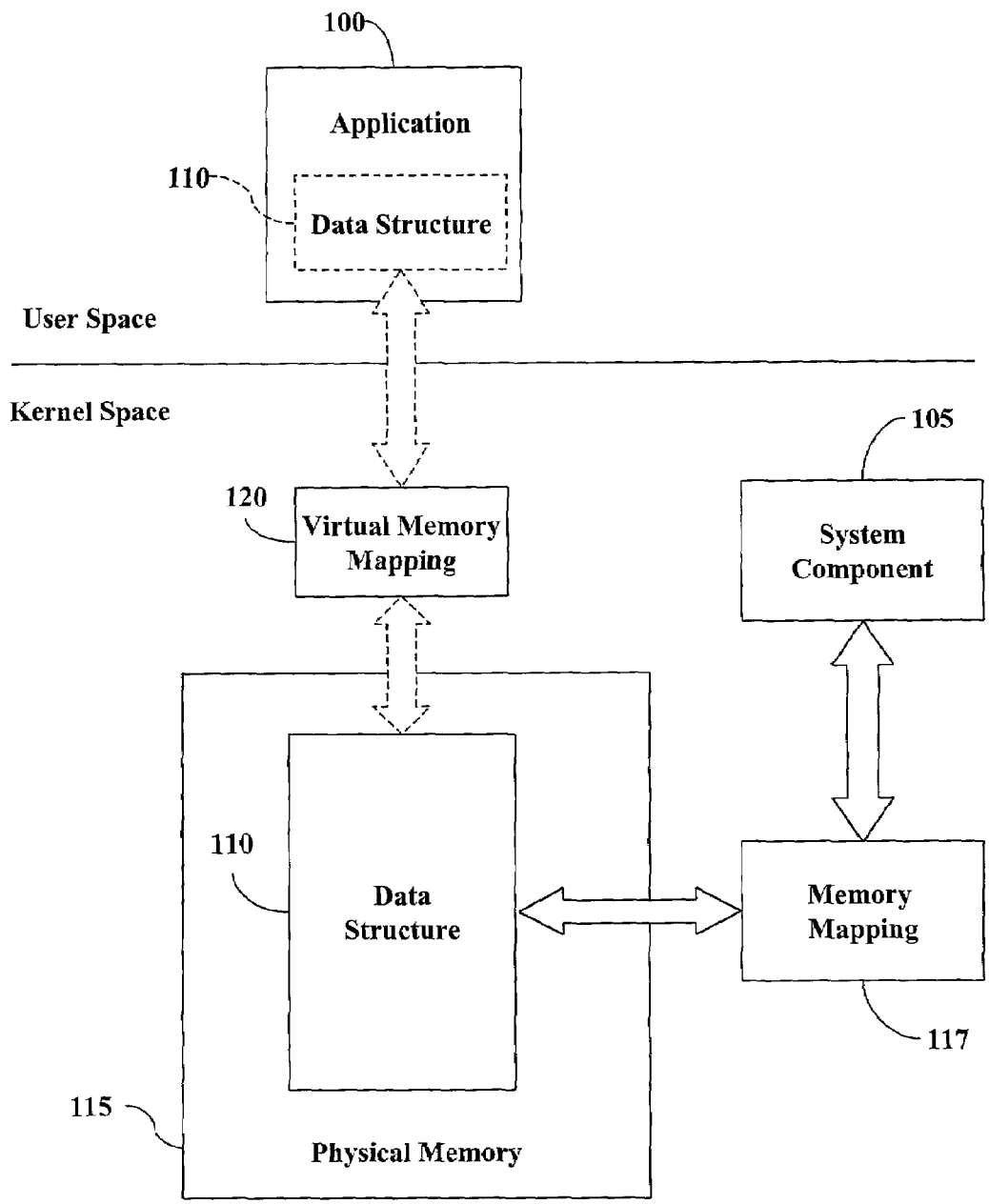
FIG. 1 is an exemplary system diagram of one embodiment of the present invention.

Illustrated in FIG. 1 is an exemplary system diagram of one embodiment of a data system that allows data to be passed between a user address space and a kernel address space. In a computer system, user applications, such as software programs, utilities and other applications, that run on top of the operating system execute in user space. User space and user applications have pre-determined memory addresses allocated for their use. The kernel space, has different pre-defined memory addresses for its use which may include physical and/or virtual memory. It will be appreciated that the kernel space and operating system address space can be used interchangeably.

For exemplary purposes, the foregoing discussion will be described in the context of a generic software application 100 that is executing in the user space. During its execution, the application 100 wishes to receive data that is collected and/or generated by a system-level component, for example, system component 105. The system component 105 may be the kernel, another system-level program, a software function(s) running as part of the operating system, a hardware device performing system-level operations, or a combination of components.

To store the data, a data structure 110 is defined in a physical address memory 115 in the kernel space. Examples of the data structure 110 may include one or more memory locations, registers, counters, data arrays, databases, other types of data structures, and/or combinations of these. In a simple form, the data structure 110 is a data buffer in the physical memory 115. The system component 115 has the physical memory addresses of the data structure mapped 117 and allocated to it along with certain assigned access rights/permissions. The access rights may include, for example, read, write, execute, delete, etc. The memory mapping 117 may be implemented as virtually memory addressing, physical memory addressing or a combination of each.

To allow the application 100 to access the data structure 110, a virtual memory mapping 120 virtually maps the data structure 110 to the user application 100 thereby making a double mapping of the kernel space physical memory, one mapping to the user address space of the application 100 and the other mapping to the system component 105 in the kernel space. With this configuration, both the application 100 and the system component 115 look at the same locations in physical memory 110 but do so using different memory addresses.

To be able to access the data structure 110, the application 100 may be given pre-determined access rights or permissions. For example, the application 100 may be given "read" access in order to read data from the data structure 110 and not be given "write" access so that the application 100 cannot intentionally or accidentally overwrite or otherwise corrupt data with the data structure. Of course, write access and other permissions can be granted to the application 100 as well as different levels of access depending on the purpose of the data structure 105 and/or desires of the system. Access rights may also be assigned differently to different portions of the data structure 110. For example, the application 100 may be allowed to write data to limited portions of the data structure 110 but can read data from all portions.

When data is loaded into the data structure 110 by the system component 105, the operating system does not have to physically transfer the data across the memory spaces because the application 100 has access to the data structure 110 using the virtual memory addressing 120. Thus, the application 100 can read the data out from the data structure 110 with a memory access. Thus, a data transfer using a system call or interrupt can be avoided. By mapping the same portion of physical memory 115 into two separate address spaces, the system can communicate data between the user space layer and the kernel space layer by a memory access instead of copying the data across the layers using a system call and/or interrupt. Likewise, the application 100, if given write privileges can write data to the data structure 110 which can then be read by the system component 105. In this manner, as described in greater detail below, instructions and other communications can be passed between address spaces without a system call.

Figure 2:
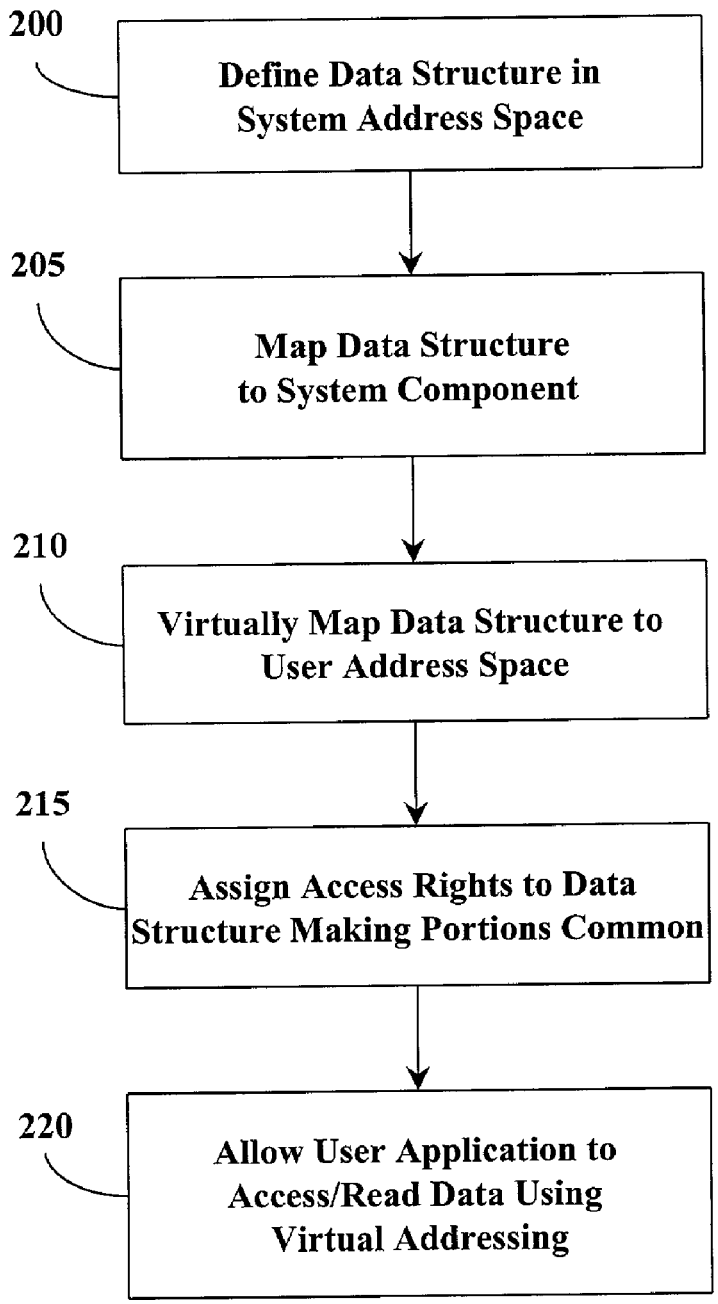
FIG. 2 is an exemplary methodology that can be used with the embodiment of FIG. 1.

Illustrated in FIG. 2 is one embodiment of a methodology associated with the system of FIG. 1. The illustrated elements denote "processing blocks" and represent computer software instructions or groups of instructions. Alternatively, the processing blocks represent functions and/or actions performed by functionally equivalent circuits such as a digital signal processor circuit or an application specific integrated circuit (ASIC). The diagram does not depict syntax of any particular programming language. Rather, the diagram illustrates functional information one skilled in the art could use to fabricate circuits, to generate computer software, or a combination of hardware and software to perform the illustrated processing. It will be appreciated that electronic and software applications may involve dynamic and flexible processes such that the illustrated blocks can be performed in other sequences different than the one shown and/or blocks may be combined or separated into additional components. They may also be implemented using various programming approaches such as machine language, procedural, object oriented or artificial intelligence techniques.

With reference to FIG. 2, when it is decided that a user application requires data to be communicated to and/or from the operating system, a data structure is defined in the system address space, e.g. kernel space, (block 200). For example, the data structure is defined in response to a request from a user application, from a request by an operating system function and/or program, or other triggering event. The data structure is mapped (virtually and/or physically) to a system component (block 205) and typically will be controlled by the system component. The data structure is also virtually mapped to a user address space (block 210) allowing the user application to access data from it.

In this regard, certain access rights or privileges are assigned to the user application (block 215) so that the data structure becomes a common/shared memory with the system component. For example, the access rights may include read access that allows the user application to read data from the data structure (block 220). With this configuration, the system component can store data in the data structure and the user application can read the data with a memory access. Thus, data can be passed between the user address space and the kernel address space through the common data structure without using a system call and/or interrupt to perform a physical data transfer.

In one embodiment, the illustrated methodology may be embodied as a computer readable product that includes one or more computer readable instructions that cause a computer to respond and/or act in the manner described. The computer readable product may be stored on any computer readable medium such as a data storage device, internal memory or a combination of both. These may include magnetic devices, optical devices, digital devices, electronic memory, or other type of data/memory device.

With reference again to FIG. 1, although the user application 100 may access the data structure 110 at any time, it may be desirable to initiate a memory access at coordinated times and/or based on certain conditions. For example, the system may be configured such that the user application 100 reads the data from the data structure 110 after the data structure is full. One manner of communicating this condition is to have the system component 105, which is loading data into the data structure 110, send a signal to the user application 100 that indicates a full condition. Likewise, the user application 100 may send replies and/or other instructions to the operating system component 115. However, such communications are typically accomplished with a system call which carries with it some system overhead. If this system overhead is desired to be reduced, the system may include a communication protocol as described in the next embodiment.

Figure 3:
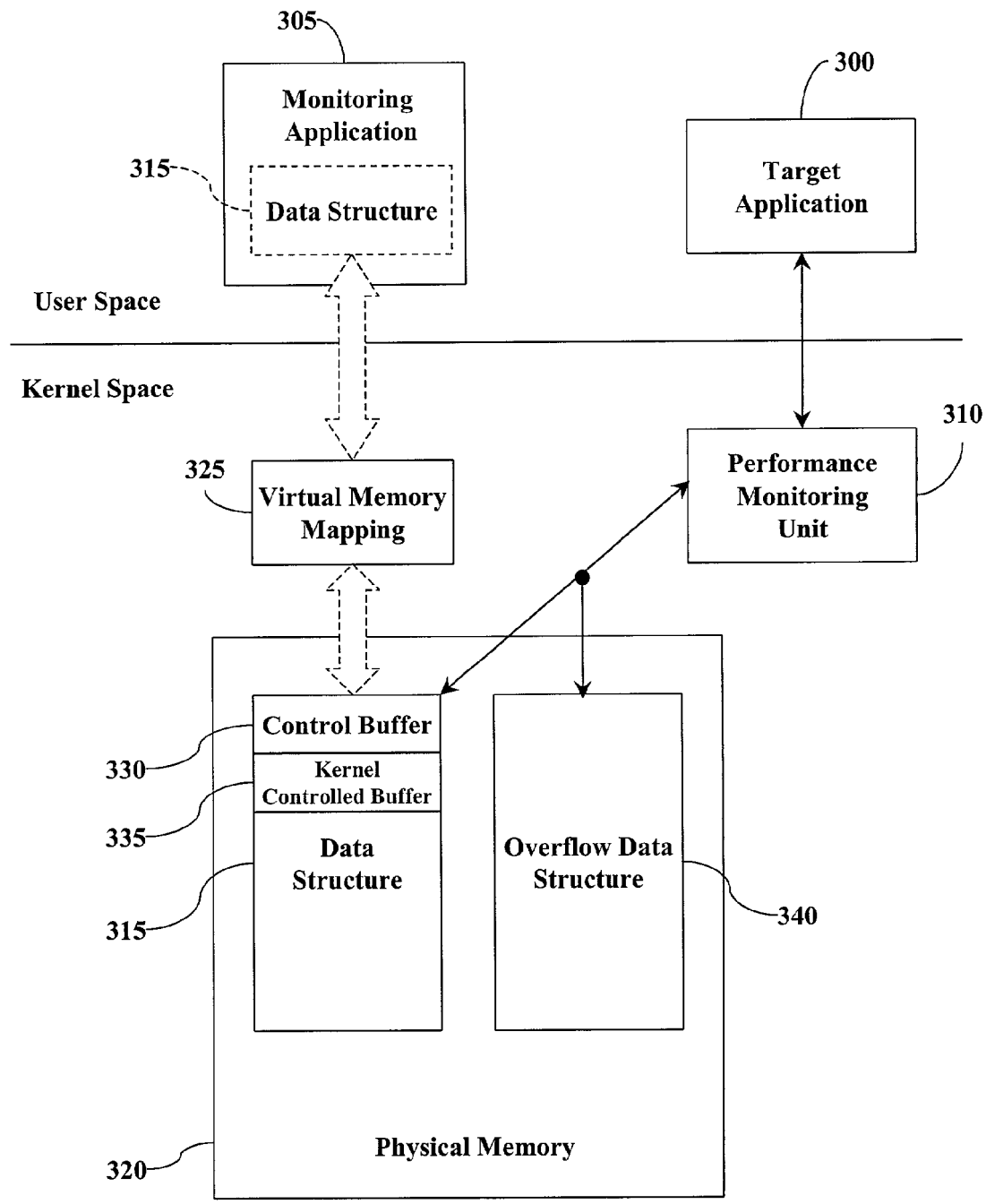
FIG. 3 is an exemplary system diagram of another embodiment of the present invention.

Illustrated in FIG. 3 is another embodiment of the system which includes an exemplary communications protocol between the address space layers. Additionally, this embodiment will be described in the context of an exemplary application that involves monitoring the performance of a target application 300. As illustrated, the figure is separated into a user address space and a kernel address space. In the user address space, a monitoring application 305 is initiated by a user or the system to collect and evaluate the performance of the target application 300 also running in the user address space.

Since user applications, such as the monitoring application 305, typically do not have appropriate permissions to access system-level data, performance monitoring typically involves one or more system-level components to collect performance data and/or parameters of the executing target application 300. The performance data is then passed to the monitoring application 305. In this embodiment, a performance monitoring unit 310 represents the system-level component(s) that collects performance sample data at the system-level. The monitoring unit 310 may be embodied as software that is part of or called by the operating system, embodied as a hardware component, or a combination of both.

For example, in the Itanium processor made by Intel, the processor includes an embedded performance monitoring unit. The Itanium also contains several registers dedicated to monitoring processor performance. Information such as the number of instructions performed can be tracked and stored. As will be described, the monitoring application 305 can access the data thus making it possible to write performance monitoring software that could have a reduced impact on system performance while monitoring is being performed. For example, hardware performance counters can exist as a small set of registers that count events, which are occurrences of specific signals related to a processor's function relating to the execution of the target application 300. Monitoring these events has a variety of uses in application performance analysis and tuning.

To initiate performance monitoring, one or more system calls can be made to the performance monitoring unit 310 instructing it to configure and begin monitoring. In the HP-UX operating system, for example, a PERFMON system call is used from the monitoring application 305 which instructs the system to allocate and configure memory for use in performance monitoring. It will be appreciated that there are other ways to initiate performance monitoring which can be accomplished by programming instructions into the code of the monitoring application 305 which will depend on the programming language used and the computer environment it runs in.

With further reference to FIG. 3, a data structure 315 is defined and allocated in physical memory 320 to store performance sample data. As mentioned previously, the data structure 315 may be mapped to the performance monitoring unit 310 using virtual memory addresses, physical memory addresses, or a combination of both. A virtual memory mapping 325 is also created that maps the data structure 315 to the monitoring application 305. As described previously, this allows the monitoring application 305 to access the data structure 315 through virtual memory addresses. Thus, it appears to the monitoring application that the data structure 315 has been allocated in the user space although only one data structure 315 physically exists. With appropriate access rights assigned, such as read access, the monitoring application 305 can read data from the data structure 315 with a memory access.

Regarding the communication protocol mentioned previously, in this embodiment, a control buffer 330 is defined to effect the communication protocol between the performance monitoring unit 310 and the monitoring application 305. The control buffer 330 is associated with the data structure 315 by being defined within the data structure and/or may be a separate portion of the physical memory 320. The control buffer 330 includes for example one or more control parameters and/or other types of information that can be set to represent pre-defined conditions, messages, instructions, and/or other types of communication information that have pre-determined meanings.

The control parameters may be defined to include one or more bits, counters, registers, memory locations, and/or other types of data structures that have changeable values. By reading these values from the control buffer 330, the monitoring application 305 and the operating system can communicate information between the kernel space and the user space without a system call. For example, setting certain parameters can be used to control handshaking so that desired events or actions can be synchronized. It will be appreciated that the control buffer 330 may be embodied as a header to the data structure 315 and is also virtually mapped to the monitoring application 305 such that it is a common buffer. It will also be appreciated that the system, when embodied as a computer readable product includes one or more computer readable instructions that cause a computer to define the control buffer and the one or more control parameters associated with it.

Figure 4:
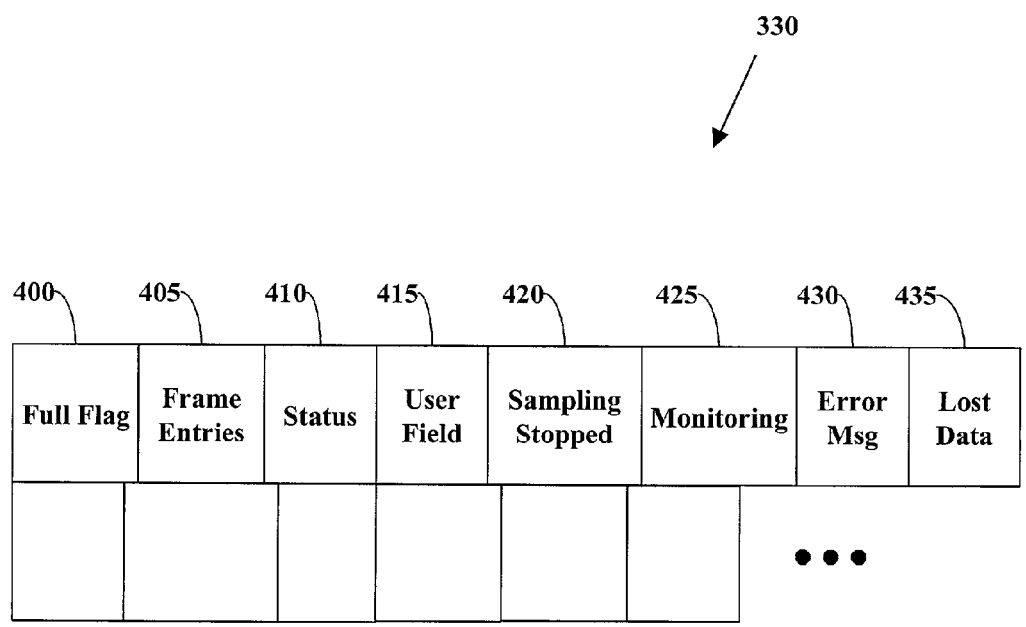
FIG. 4 is an exemplary control buffer that can be used with the embodiment of FIG. 3.

Illustrated in FIG. 4, is one embodiment of the control buffer 330 configured with a variety of control parameters used to communicate instructions, conditions, and/or other messages between the user space and the kernel space. For example, it may desired that the monitoring application 305 reads data from the data structure 315 after the structure is full, rather than doing partial reads. To this end, the control buffer 330 may include a full flag 400 or otherwise a "read" parameter that has a yes or no state, e.g. "1" or "0". Of course, the full flag may include additional data and/or have various data lengths as desired. Once the data structure 315 is fully loaded with sample data, the full flag 400 can be set to indicate a full state. The monitoring application 305 can periodically check the full flag 400 with a memory access to read its value. Once the full flag is set to full, the monitoring application 305 knows it can read the data from the data structure 315. In this manner, the performance monitoring unit 310 can pass instructions to the monitoring application 305 by setting the full flag 400 rather than using a system call. Of course, the operating system and/or kernel can also be responsible for setting values in the control buffer 330.

Other types of flags, conditions, and/or instructions can be pre-defined in the control buffer 330. For example, the control buffer 330 can include a frame entries counter 405 that indicates the number of frames stored in the data structure 330. Each time sample data is loaded into the data structure, the frame entries counter 405 is incremented. A status field 410 may be included with pre-defined values for various status conditions. A user field 415 can be defined for use by the monitoring application 305, for example, that sets values indicating that it is reading from the data structure 315 so that the performance monitoring unit 310 knows not to write data until the monitoring application releases the buffer. A sampling stopped flag 420 can be used to indicate that the monitoring unit 310 has stopped sampling, thus, the monitoring application 305 can read from the data structure although the data structure may not be full.

With further reference to FIG. 4, a monitoring flag 425 may be used to indicate that monitoring is in process, has stopped, has paused, or other type of monitoring condition. An error message field 430 can be used to indicate a variety of errors that may occur during performance monitoring that are encountered by the performance monitoring unit 310. A separate error message flag could also be used for the monitoring application 305 to indicate errors occurring during its processing. A lost data flag 435 may be set to indicate that data has been lost. It will be appreciated that other types of communication information can be pre-defined and used in the control buffer 330 to pass information between kernel space and the user space. This includes having less parameters or more parameters than those illustrated, and may include having different parameters.

With this configuration, information and other instructions can be passed therebetween by using ordinary memory access rather than a system call. This includes configuring the parameters to control handshaking between the kernel and the monitoring application 305. Thus, depending on the values of the parameters, the monitoring application can know whether or not to take certain actions that the operating system wants it to take or not take, or vise versa. Of course, both the operating system and the user application need to know the meaning of each parameter and their possible values. In one embodiment, a master file containing this information may be stored in memory and/or in persistent storage, and values can be compared to the master file to determine their meaning.

With reference again to FIG. 3, another embodiment may include a separate control buffer 335 used as a backup for the common control buffer 330. To reduce the chances of data corruption of the common control buffer 330, the backup buffer 335 is controlled by the kernel and access from user space is not permitted. Barring any errors, the kernel controlled buffer 335 should be a duplicate of the common control buffer 330. Since the monitoring application 305 may have certain "write" privileges to the common control buffer 330, certain data may intentionally or accidentally be corrupted or overwritten. Should this happen, data from the kernel controlled buffer 335 can be used to reload the common buffer 330.

Additionally, an overflow data structure 340 may be allocated in physical memory 320 as an overflow buffer. When the data structure 315 becomes full, the full flag 400 can be set. However, data collection may still continue before the monitoring application 305 reads out the data and releases the data structure 315. In this case the performance monitoring unit 310 can begin loading the performance data into the overflow data structure 340.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. A system for collecting performance data by an operating system that monitors a performance of one or more instructions executing on a computer system, the system comprising:
   a data structure in an operating system address space of the computer system and maintained by the operating system for storing at least performance data of the one or more instructions collected by the operating system; and
   a virtual memory mapping in the operating system address space that maps the data structure to a monitoring application executing in a user address space of the computer system allowing the monitoring application to read the performance data from the data structure without transferring the performance data to the user address space using a system interrupt.

2. The system as set forth in claim 1 further including one or more communication parameters maintained in the data structure which are set to pass information between the operating system and the monitoring application without a system call.

3. The system as set forth in claim 2 wherein the one or more communication parameters include one or more parameters predefined to control handshaking between the operating system and the monitoring application.

4. The system as set forth in claim 2 wherein the one or more communication parameters include a full flag that when set, instructs the monitoring application to read the performance data from the data structure.

5. The system as set forth in claim 2 wherein the one or more communication parameters include at least one of: one or more bits, one or more counters, and one or more data registers.

6. The system as set forth in claim 1 wherein the data structure includes one or more memory buffers, one or more memory locations, one or more data registers, or a combination of each.

7. The system as set forth in claim 1 further including a plurality of data structures maintained by the operating system to store at least the performance data.

8. The system as set forth in claim 1 further including a performance monitoring unit in communication with the operating system that collects the performance data of the one or more instructions and loads the performance data into the data structure.

9. The system as set forth in claim 2 further including header information defined within the data structure, the header information containing the one or more communication parameters.

10. The system as set forth in claim 2 wherein the one or more communication parameters include a read parameter that is changeable by the operating system to indicate to the monitoring application that the monitoring application may read the data stored in the data structure.

11. The system as set forth in claim 2 wherein the data structure is a data buffer.

12. The system as set forth in claim 2 further including at least one of memory addresses, counters, and data registers that store the one or more communication parameters.

13. The system as set forth in claim 2 wherein the one or more communication parameters are virtually mapped to the monitoring application allowing direct access thereto.

14. The system as set forth in claim 1 wherein the operating system collects performance data of a target application and stores the performance data to the data structure.

15. The system as set forth in claim 1 further including one or more communication parameters maintained in the data structure which are set to pass instructions between the operating system and the monitoring application using the data structure without a system call.

16. The system as set forth in claim 1 wherein the one or more communication parameters associated with passing instructions represent predefined instructions.

17. The system as set forth in claim 1 further including an overflow data structure for storing data when the data structure is full.

18. A computer readable product stored on a computer readable medium comprising:
- one or more first computer readable instructions that cause a computer to define a data structure within a kernel address space for storing data;
- one or more computer readable instructions that cause the computer to virtually map the data structure to an application in a user address space allowing the application to directly read the data from the data structure in the kernel address space; and
- one or more second computer readable instructions that cause the computer to define one or more control parameters associated with the data structure where communication handshaking is established between the kernel address space and the user address space by setting predetermined values for the one or more control parameters.

* * * * *

UNITED STATES PATENT AND TRADEMARK OFFICE
CERTIFICATE OF CORRECTION

| | |
|---|---|
| PATENT NO. | : 7,058,786 B2 |
| APPLICATION NO. | : 10/051773 |
| DATED | : June 6, 2006 |
| INVENTOR(S) | : Richard Oliveri |

Page 1 of 1

It is certified that error appears in the above-identified patent and that said Letters Patent is hereby corrected as shown below:

On the title page, item (73), in "Assignee", column 1, line 2, after "Company," insert -- L.P., --.

Signed and Sealed this

Twenty-eighth Day of July, 2009

JOHN DOLL
*Acting Director of the United States Patent and Trademark Office*